United States Patent [19]

Amano

[11] Patent Number: 5,003,337

[45] Date of Patent: Mar. 26, 1991

[54] CAMERA SYSTEM

[75] Inventor: Kenichiro Amano, Tokyo, Japan

[73] Assignee: Canon Kabushiki Kaisha, Tokyo, Japan

[21] Appl. No.: 415,771

[22] Filed: Oct. 2, 1989

[30] Foreign Application Priority Data

Apr. 10, 1988 [JP] Japan .................................. 63-250327

[51] Int. Cl.⁵ .............................................. G03B 13/36
[52] U.S. Cl. .................................... 354/400; 354/402; 354/286
[58] Field of Search ....................... 354/400, 402, 286

[56] References Cited

U.S. PATENT DOCUMENTS

| | | | |
|---|---|---|---|
| 4,156,563 | 5/1979 | Kato et al. ........................... | 354/25 |
| 4,623,234 | 11/1086 | Shimizu et al. ..................... | 354/286 |
| 4,669,849 | 6/1987 | Ohtsuka et al. ..................... | 354/400 |
| 4,682,871 | 7/1987 | Metabi ................................. | 354/400 |
| 4,779,117 | 10/1988 | Fujino et al. ........................ | 354/400 |
| 4,783,676 | 11/1988 | Aihara et al. ....................... | 354/400 |
| 4,816,663 | 3/1989 | Utagawa et al. .................... | 354/402 |

Primary Examiner—Russell E. Adams
Attorney, Agent, or Firm—Fitzpatrick, Cella, Harper & Scinto

[57] ABSTRACT

A camera system of the kind arranged to store a lens position obtained at a specific point in time prior to automatic focusing by an automatic focusing device and, when an operation member is operated, to forcedly shift the lens to the stored lens position independently of the automatic focusing action is characterized in that:
  when the lens position is stored at the specific point in time, photographing conditions obtained at that point in time are also stored. The camera is set to be in the photographing conditions stored when the lens is shifted to the stored lens position by the operation of the operation member.

18 Claims, 8 Drawing Sheets

CAMERA SYSTEM

BACKGROUND OF THE INVENTION

1. Field of the Invention

This invention relates to a camera which stores information on photographing conditions such as the distance to an object to be photographed, the mode of exposure, an exposure correction value, etc., and is arranged to perform, when necessary, a photographing operation on the basis of the information stored.

2. Description of the Related Art

Heretofore a camera which is arranged to have the function of the above-stated kind has been provided with a memory for storing the distance to an object to be photographed in addition to an automatic focusing device (hereinafter referred to as an AF device), an automatic exposure device (hereinafter referred to as an AE device), etc.. For example, the object distance obtained for a photographing scene is stored for later use. After that, photographing can be performed for the same specific object without missing any photographic opportunity by calling up the measured distance data stored and by performing only a light measuring action, although distance and light measuring actions must be performed each time for photographing at a different photographing position.

In the case of the above-stated conventional camera, objects other than the specific object must be photographed in a priority mode and at an exposure correction value suited for each of them. Therefore, if the mode and the correction value are not suited for the scene for which the photographing position is stored, it would be difficult to take an optimized exposure picture without readjustment of the priority mode, the control value thereof, and the exposure correction value, even if the distance measuring ring of the photo-taking lens is moved quickly by using the measured distance data stored. This impairs the advantageous feature that a photographing operation can be speedily carried out by virtue of the stored position of the distance measuring ring.

Further, if the camera is not arranged to have any absolute distance information for moving the distance measuring ring of the photo-taking lens, and if a reproducing action is performed for photographing on the basis of a previously stored specific object position after one photo taking lens is interchanged with another, the action would be incorrectly performed thereby making accurate focusing impossible.

SUMMARY OF THE INVENTION

It is one aspect of the invention described in the present application to provide a camera system of the above-stated kind, wherein: an object position obtained at a specific point in time is stored; in addition to the object position, other photographic conditions such as an exposure value, a photographing mode, a correction value, etc., obtained at that point in time are also stored; in reproducing the data thus stored, these photographic conditions are read out along with the object position; and focusing and exposure control actions are performed on the basis of the data thus reproduced or read out.

It is another aspect of the invention to provide a camera system which in accordance with the object of the invention described above, is arranged to cancel previously stored values when the lens is interchanged with another lens, so that focusing and other control actions can be prevented from being performed on the basis of the previously stored values even after the interchanging of the lens.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
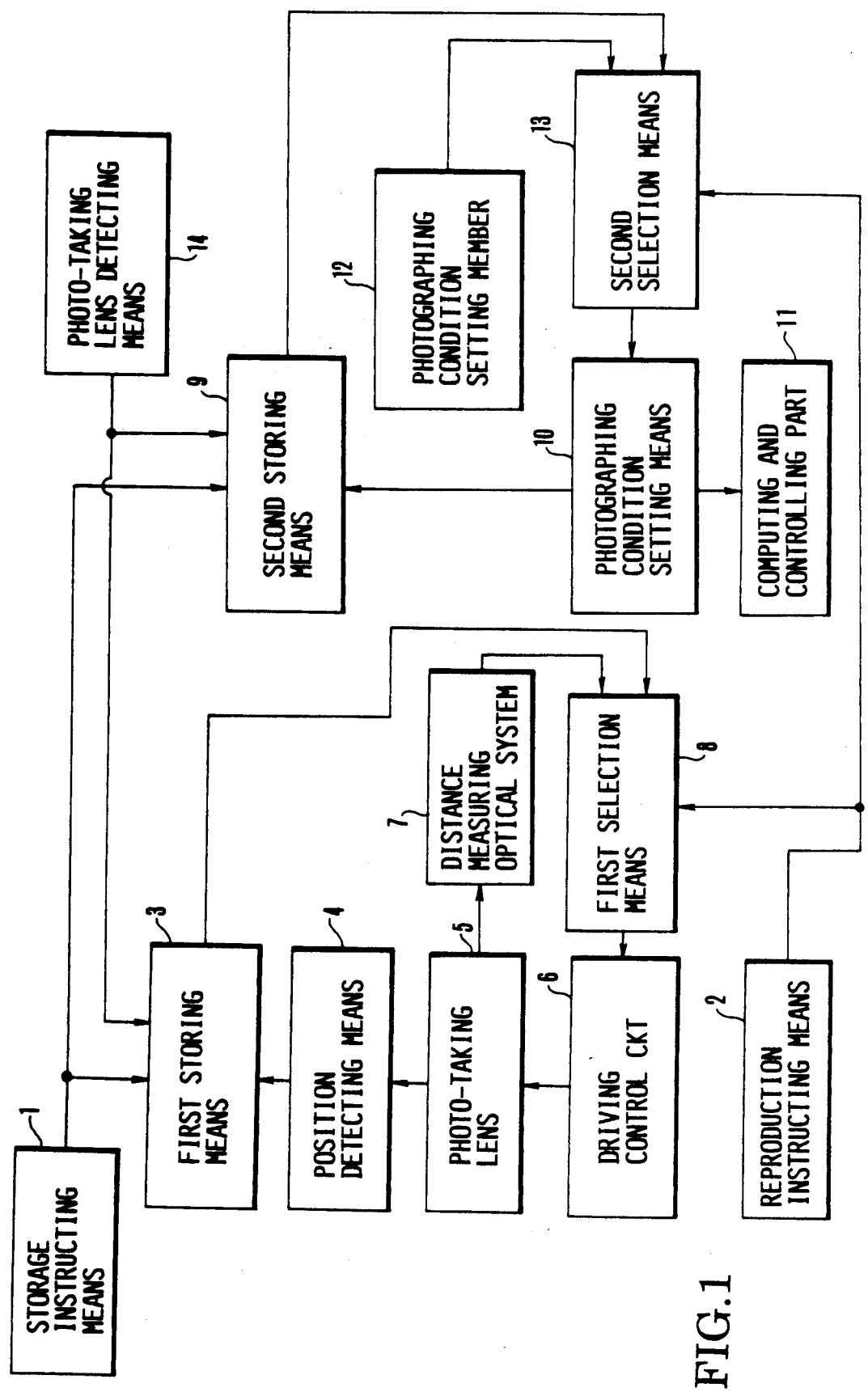
FIG. 1 is a block diagram showing a camera system which is arranged according to the present invention as an embodiment thereof.

The details of the present invention are as described below in the form of preferred embodiments thereof with reference to the accompanying drawings:

FIG. 1 shows in a block diagram a camera which is arranged according to the present invention as an embodiment thereof. Referring to FIG. 1, first storing means 3 is arranged to store measured distance information. Second storing means 9 is arranged to store the photographing conditions of the camera, such as an AE mode, etc.. When a storage instructing means 1, which consists of switches, etc., and is disposed on the body of the camera, is turned on, the first storing means 3 stores distance information obtained from position detecting means 4 and the second storing means 9 also stores, at the same time, information on photographic conditions coming from setting means 10. A photo-taking lens 5 consists of an image forming optical system, a lens barrel which is arranged to carry the optical system, etc.. When a current is supplied to a motor (not shown) which is mounted on the lens barrel, the motor drives a distance ring (not shown) to shift a focusing lens which is not shown but is included in the lens barrel. Distance ring position detecting means 4 is arranged to detect the position of the distance ring corresponding to the object distance through a change taking place, for example, in the resistance value of a sliding resistor and to supply information on the distance detected to the first storing means 3. A distance measuring optical system 7 is arranged to have a photo-electric converting element such as a CCD illuminated with light and to convert the result thereof into an electrical signal. A driving control circuit 6 consists of a driving member which is a motor mounted on the lens barrel, is arranged to move the focusing lens of the photo-taking lens 5 backward or forward for focus adjustment and a control circuit which is provided for the motor. The light of an object which has passed through the photo-taking lens 5 is photo-electrically coverted by the distance measuring optical system 7. The defocus degree of the focusing lens is computed by the system 7 and is supplied to the driving circuit 6 via first selection means 8. The focusing lens is driven according to this computed defocus degree for focusing.

A reference numeral 8 denotes the first selection means while a numeral 13 denotes second selection means. When reproduction instructing means 2, which consists of switches, etc., and is mounted on the camera body, is turned on, the first selection means 8 changes the information input of the driving control circuit 6 from the output of the distance measuring optical system 7 over to that of the first storing means 3; and the second selection means 13 changes the information input of photographing condition setting means 10 from the output of a setting member 12 over to that of the second storing means 9.

The photographing condition setting means 10 is arranged to have photographing conditions such as the AE mode and an exposure correction value of the camera set there. A photographing condition setting member 12 is arranged to permit the photographer to set photographing conditions such as the AE mode, the exposure correction value, etc. while watching a display made by a display part which is not shown but is disposed on the camera body and consists of a liquid crystal panel, etc.. An exposure computing and controlling part 11 is arranged to compute such exposure information as a shutter time value TV and an aperture value AV and to control the shutter and the aperture of the photo-taking lens accordingly. The computing and controlling part 11 includes a microcomputer.

Photo-taking lens detecting means 14 is arranged to detect whether the photo-taking lens 5 is mounted on the camera body. When the photo-taking lens 5 is detached from the camera body, the detecting means 14 supplies a reset signal to the first and second storing means 3 and 9 to erase information stored there.

The operation of the camera is as follows. In an ordinary case, that is, when the reproduction instructing means 2 is not operated, the camera operates as follows. When a shutter release button which is not shown is lightly pushed, distance and light measuring actions begin. The defocus degree of the lens computed by the distance measuring optical system 7 via the photo-taking lens 5 is transmitted via the first selection means 8 to the driving control circuit 6. The lens is driven and moved to its in-focus position accordingly. The photographing conditions of the camera such as the AE mode, the setting value thereof, an exposure correction value, etc., are set at the photographing condition setting means 10 via the photographing condition setting member 12 and the second selection means 13. An exposure value is computed by the computing and controlling part 11 on the basis of the set information. Then, photographing is performed when the shutter release button is pushed further.

Next, when the storage instructing means 1 is operated, information on the current position of the distance (measuring) ring is obtained from the photo-taking lens 5 via the position detecting means 4 and is stored by the first storing means 3. At the same time, the setting values which relate to an exposure and are set by the photographing condition setting means 10 are stored at the second storing means 9. These actions are not performed if the lens detecting means produces information indicating the absence of the lens.

Following this, when the reproduction instructing means 2 is operated after the lens is operated and the setting values are changed, the first and second selection means 8 and 13 select the new setting values if the values are stored at the first and second storing means 3 and 9. Therefore, the lens driving control circuit 6 drives the lens according to the lens position data stored. The photographing condition setting means 10 takes in each setting value stored at the second storing means 9. Then, the data for the AE mode and the exposure correction value comes back to the state obtained when the storage instructing means 1 is operated. The computing and controlling part 11 then computes and controls the shutter speed (time) value TV and the aperture value AV on the basis of the AE mode and the exposure correction value thus set. Then, actual shooting is performed.

Further, when the lens is dismounted, the value data stored at the storing means 3 and 9 is erased by the lens detecting means 14.

Figure 2:
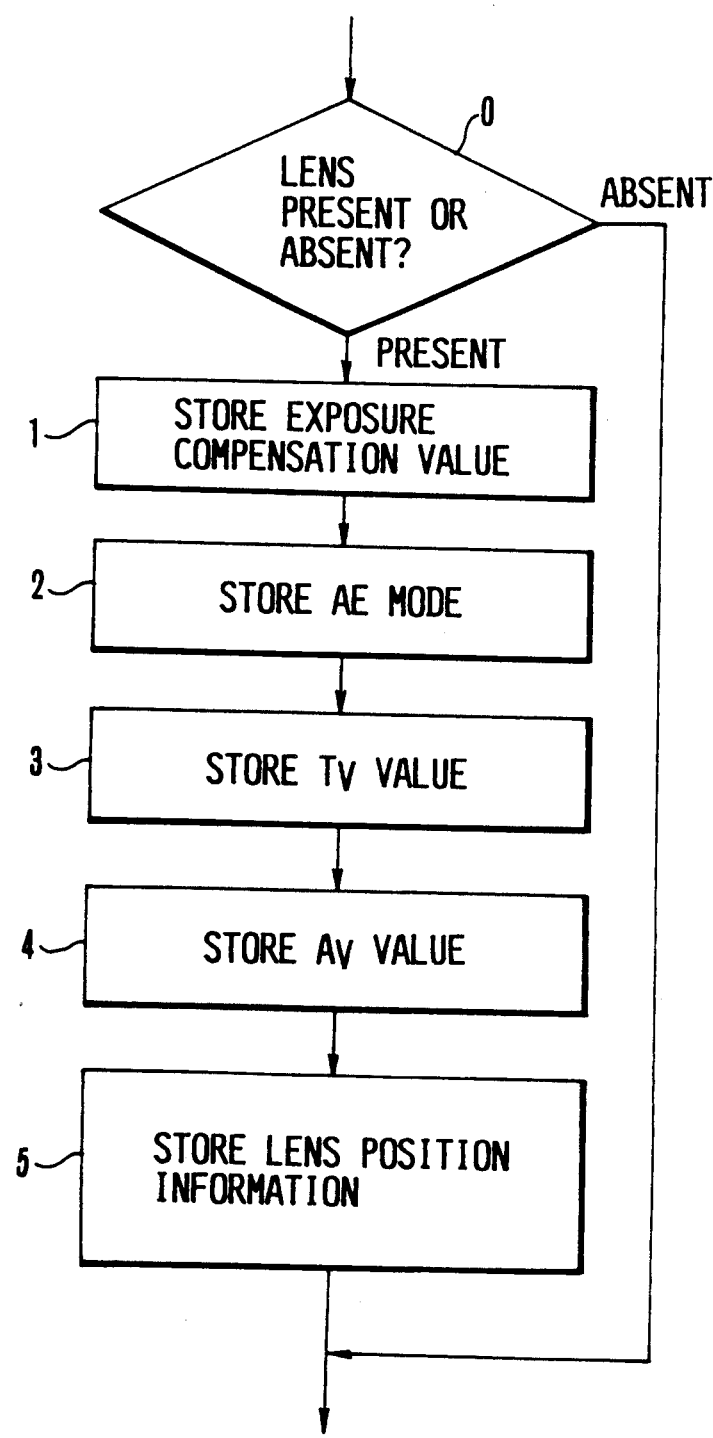
FIG. 2 is a flow chart showing the storing action of a computing and controlling part 11 of the camera shown in FIG. 1.

Next, the operation of the computing and controlling part 11 is described with reference to FIGS. 2 and 3 which are flow charts. Referring to FIG. 2, the storing action is performed as follows. When the storage instructing means 1 is operated, the flow of operation of the invention comes to a step 1 only when the lens is found to be present at a step 0. Step 1: An exposure compensation value is stored. Step 2: The AE mode data is stored. Step 3: A Tv value data is stored. Step 4: An Av value is stored. Step 5: Data for the position of the lens is stored. The storing action comes to an end at the step 5.

Figure 3:
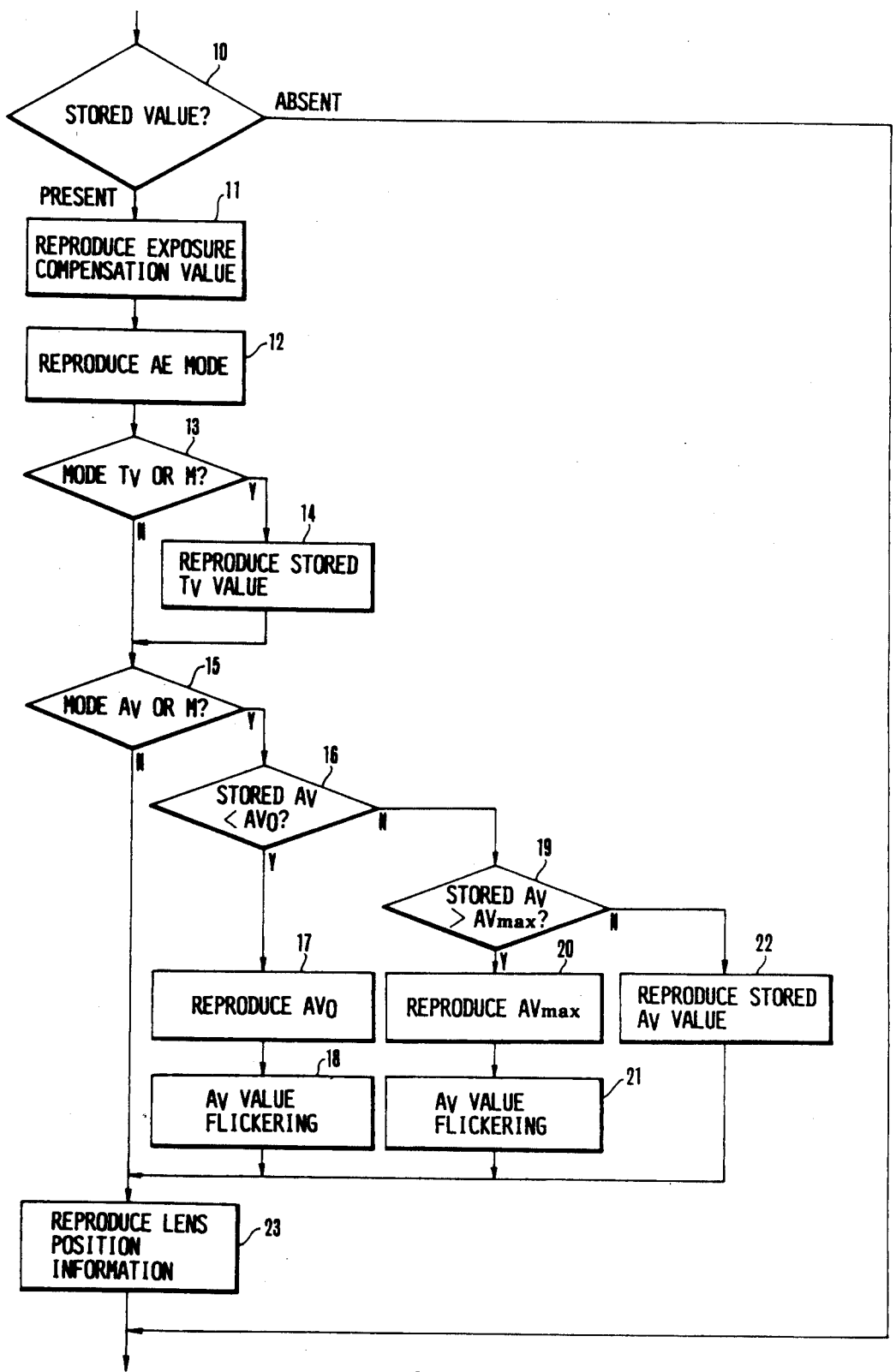
FIG. 3 a flow chart showing the reproducing action of the computing and controlling part 11 shown in FIG. 1.

Referring to FIG. 3, the control action for reproduction (reading data) is performed as follows. When the reproduction instructing means 2 is operated, the routine of FIG. 3 is executed. At a step 10: The flow of operation proceeds to a step 11 only when data is in storage. At the step 11: The exposure compensation value is reproduced (read out). At a step 12: One of AE modes including a program mode, a Tv priority mode, an Av priority mode and a manual mode is reproduced.

At steps 13 and 14: If the AE mode selected is the Tv priority mode or the manual mode, the Tv value in storage is reproduced. At steps 15 to 22: If the mode is the Av priority mode, or the manual mode, the Av value in storage is reproduced. However, if the Av value in storage is found to be smaller than the value AVo of the lens at the step 16, reproduction is made with the value AVo at the step 17. At the step 18, the value AVo is displayed in a flickering state by a display element to give a warning. At the step 19: If the Av value in storage is found to be larger than the value AVmax of the lens, reproduction is made with the value AVmax at the step 20. Then, at the step 21, the value AVmax is displayed with flickering by the display part to give a warning. In case that the Av value in storage is found to be within a range between the aperture values AVo and AVmax, the stored Av value is reproduced (read out) at the step 22. At a step 23: The lens position information is reproduced and the reproducing action comes to an end.

Figure 4:
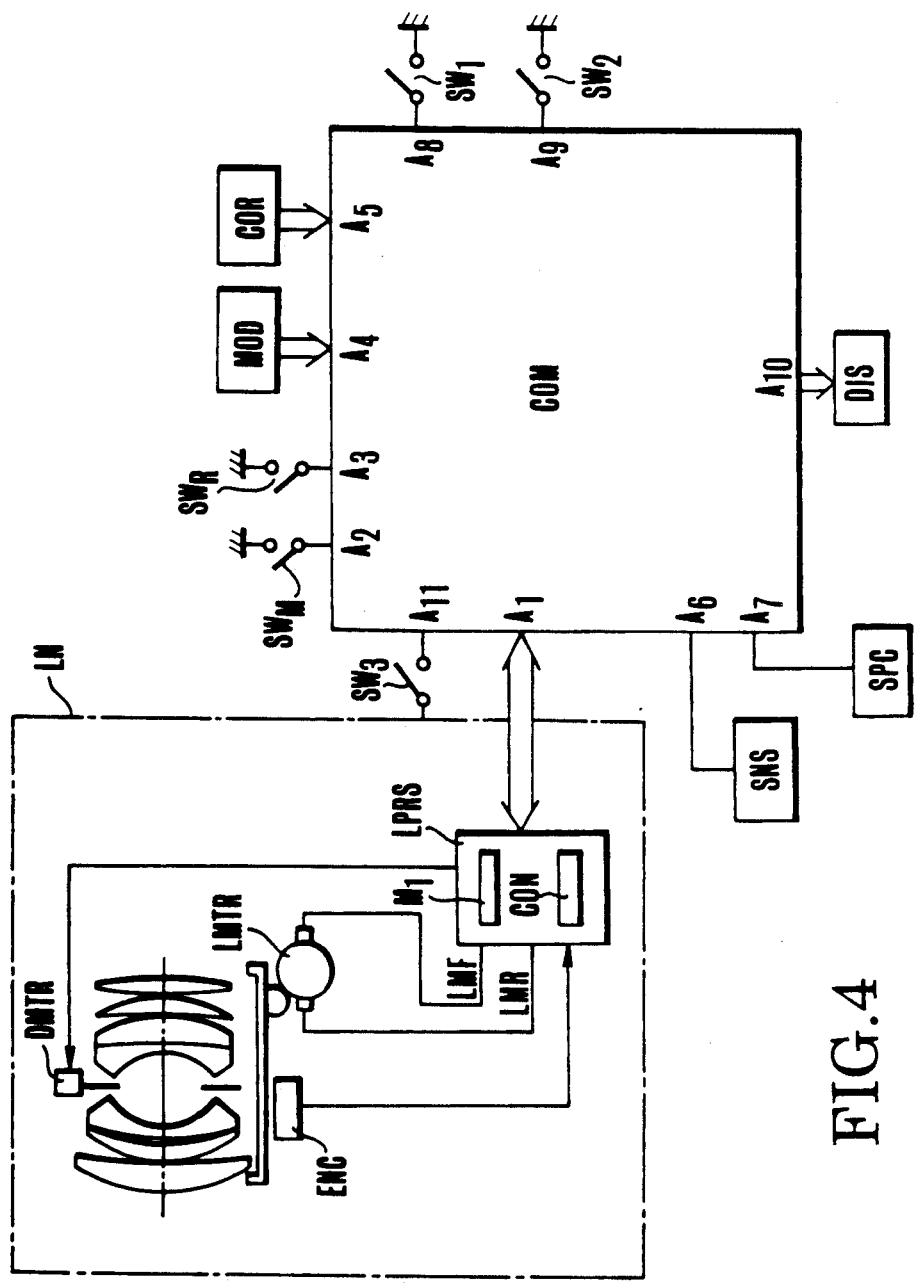
FIG. 4 a circuit diagram showing the arrangement of the block diagram of FIG. 1.

FIG. 4 is a circuit diagram showing the details of the block diagram of FIG. 1. Referring to FIG. 4, a reference symbol LN denotes a lens unit mounted on the camera body. A symbol LMTR denotes a motor which is arranged to move the focusing lens in the direction of the optical axis of the lens. A symbol LPRS denotes a motor control circuit which is arranged to drive and control the motor LMTR. The motor LMTR and the control circuit LPRS jointly form a driving control circuit 6 of FIG. 1. An encoder ENC is a pulse plate which is arranged to produce a number of pulses corresponding to a change occurred in the position of the lens in association with the movement of the lens. A counter CON is arranged to count the pulses produced from the encoder ENC. The counter CON either counts up or counts down according to the rotating direction of the motor LMTR. The counted value of the counter CON represents the current lens position. The counter CON thus forms the position detecting means 4 of FIG. 1. Further, the control circuit LPRS has a memory M1 and is arranged to add together a defocus degree produced from a computer COM via a port A1 and the current counted value of the counter CON and to temporarily store the sum thus obtained at the memory M1. After that, the lens is driven until the count value of the counter CON is caused by the movement of the lens to come to coincide with the value stored at the memory M1.

A stepper motor DMTR is arranged to control an diaphragm member. The control circuit LPRS produces a signal for causing the stepper motor DMTR to drive and control the diaphragm member. A mode setting member MOD is arranged to permit selection of the exposure mode from among the program mode, the manual mode, the shutter priority mode, the aperture priority mode, etc.. A setting value setting member COR is arranged to set the setting value of the exposure compensation value and that of the manual mode or that of the each of the priority modes. The setting member COR forms to the setting member 12 of FIG. 1 in conjunction with the above-stated mode setting member MOD. A light receiving element SNS for distance measurement consists of a pair of sensors arranged to receive the light of an object's image through the phototaking lens. A light measuring circuit SPC has a light measuring sensor. A switch $SW_M$ is arranged to be turned on and off by a manual operation and corresponds to the storing instruction means 1 of FIG. 1. The camera includes a display device DIS. A switch $SW_R$ is arranged to be turned on and off by manual operation and corresponds to the reproduction instructing means 2 of FIG. 1. The switches $SW_1$ and $SW_2$ are arranged to be turned on respectively by the first and second strokes of operation on a shutter release button which is not shown.

The computer COM is provided with ports A1 to A11. The computer COM has a memory serving as the storing means 3 and 9 of FIG. 1 and computing and determining functions serving as the computing and controlling part 11, the setting means 10 and selection means 13 and 8 of FIG. 1. The above-stated setting member COR consists of three setting parts which are respectively arranged to set the compensation value, the shutter time value, and the aperture value. The port A5 of the computer COM which corresponds to the setting member COR also consists of three ports for these three setting parts. A switch $SW_3$ is arranged to turn on when the lens unit is mounted on the camera body and serves as the setting means 14 of FIG. 1.

Figure 5:
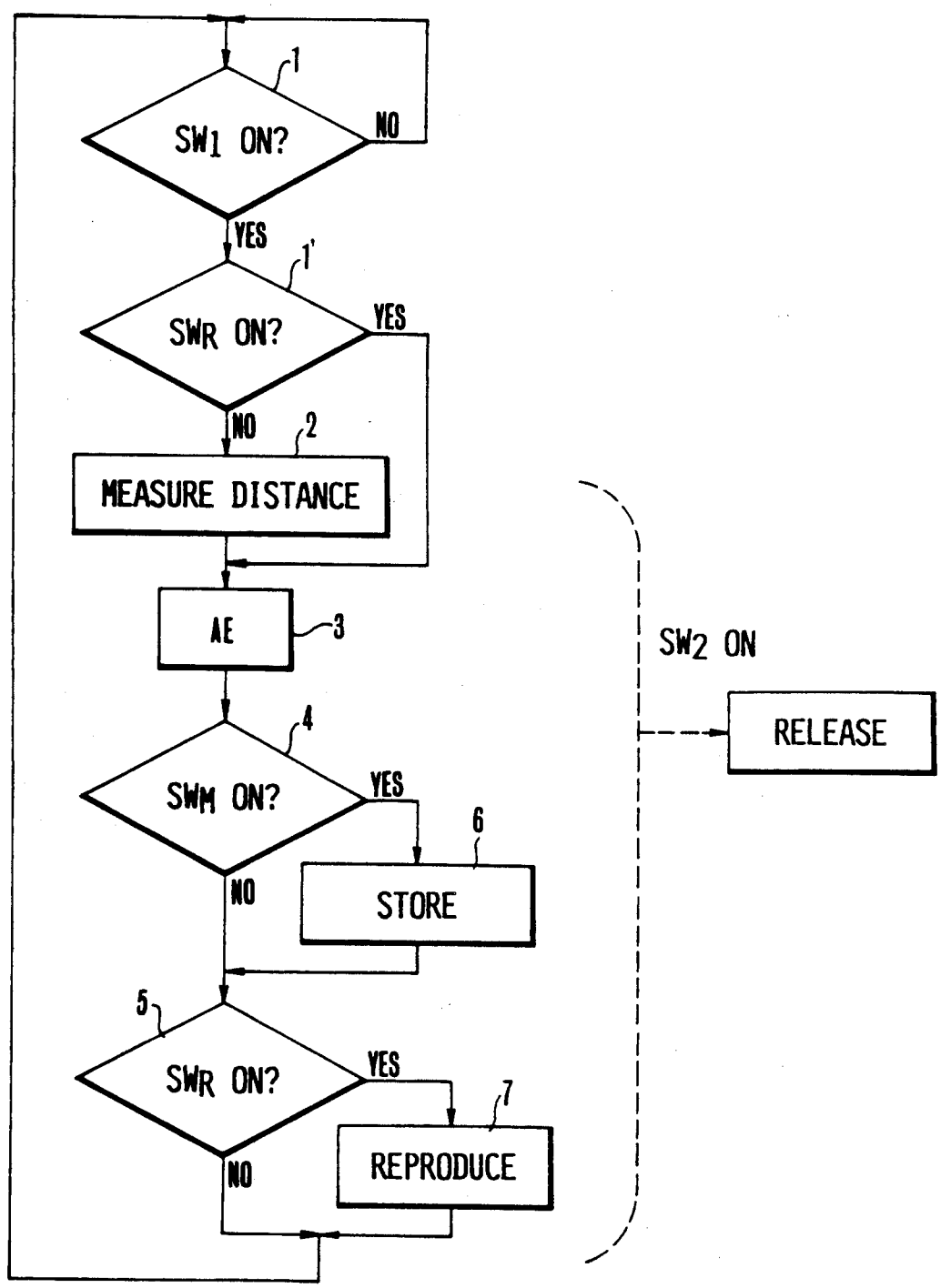
FIG. 5 is a flow chart showing the main program of operation of the embodiment shown in FIG. 4.

FIG. 5 is a flow chart showing the main program of operation of the computer COM of FIG. 4. Referring to FIG. 5, the computer COM checks for the on-state of the switch $SW_1$ at a step 1. The step 1 is continuously executed so long as the switch $SW_1$ remains off.

When the shutter release button is operated to the extent of its first stroke position to turn on the switch $SW_1$, the flow of the main program proceeds to a step 1'. At the step 1', a check is made for the on-state of the switch $SW_R$. If the switch $SW_R$ is found to be off, the flow proceeds to a step 2. At the step 2, an automatic focusing action is carried out.

For the automatic focusing action, the output of the distance measuring light receiving element SNS is supplied to the computer COM via the port A6. The defocus degree of the lens for the object to be photographed is computed on the basis of the output of this light receiving element in accordance with a known algorithm. Information on the defocus degree thus obtained is sent to the control circuit LPRS of the lens unit LN. Upon receipt of the information pertaining to the defocus degree, the control circuit LPRS adds that information to the counted value of the counter CON. The result of this addition is supplied to the memory M1. The result of this addition supplied to the memory M1 indicates the lens position at which an in-focus state is obtained for the object located at a measured distance. The control circuit LPRS causes the motor LMTR to rotate in the direction corresponding to whether the defocus degree is positive or negative. The motor drives the focusing lens toward the in-focus position of the lens. In association with the focusing action, the counter CON counts the pulses produced from the encoder ENC. The motor LMTR is brought to a stop when the counted value of the counter CON comes to coincide with the information on the target (in-focus) lens position stored at the memory M1. The lens is thus moved to the target lens position to have the lens focused on the object located at the distance measured. At the step 2, when the defocus degree signal is completely sent to the lens unit LN, the flow proceeds to a step 3. Therefore, the lens driving action mentioned above is carried out through the execution of step 3 and the ensuing steps.

At the step 3, information on the mode selected by the mode setting member MOD and the value set by the setting value setting member COR is supplied via the ports A4 and A5 to the computer COM. Further, a measured light signal which is produced from the light measuring circuit SPC is supplied via the port A7 to the computer COM. The computer COM computes the set value and the measured light signal in the mode corresponding to the mode signal received. An exposure value (shutter time and aperture value) is thus obtained for the mode.

Steps 4 and 5: A check is made for the on-states of the switches $SW_M$ and $SW_R$. If these switches are found to be off, the flow comes back to the step 1. After that, the above-stated steps are repeatedly executed to repeat the automatic focusing and exposure value computing actions so long as the switch $SW_1$ remains on. Further, if the switch $SW_2$ is turned on by a second stroke operation on the shutter release button during the process of repeating the above stated series of steps, an interruption takes place to perform a release action for photographing at the exposure value obtained at the step 3.

When the switch $SW_M$ is turned on, the flow of the program comes from the step 4 to a step 6. The step 6 consists of steps which are identical with the steps of FIG. 2. A check is made for the state of the switch $SW_3$ at the step 0 of FIG. 2. If the switch $SW_3$ is found to be on thus indicating that the lens unit is mounted on the camera body, the flow comes to the step 1 of FIG. 2 to have the exposure correction value which is set by the value setting member COR stored at the memory. At the step 2 of FIG. 2, the mode signal from the mode setting member MOD is stored at the memory. At the steps 3 and 4 of FIG. 2, the exposure value set at the step 3 of FIG. 5 is stored. In the event that the manual mode is set, the shutter time and aperture values stored at the steps 3 and 4 are manually set. In the shutter priority mode or the aperture priority mode, these values are automatically set.

At the step 5 of FIG. 2, the counted value of the counter CON of the lens unit LN, i.e. information on the current lens position, is sent to the computer COM to have information on the current lens position stored.

Again referring to FIG. 5, after completion of the storing action of the step 6 (of FIG. 5), the flow comes to a step 5. At the step 5 and ensuing steps, the automatic focusing and exposure computing actions are repeated as mentioned in the foregoing.

Further, the switch $SW_M$ is arranged to be turned on by a pushing operation performed on a push button which is not shown and to be turned off when the button is released from the pushing operation. The storing action is allowed to be carried out only while the button is pushed.

After each data has been stored at the step 6, the push button is released from the pushing operation to have the steps 1 to 5 of FIG. 5 repeatedly executed. Then, if the mode, etc. are changed by operating the mode setting member MOD and the value setting member COR during the step repeating process, another exposure value corresponding to the new mode is computed at the step 3.

In case that the switch $SW_R$ is turned on under the above-stated condition, the flow of operation is performed in the following manner. With the switch $SW_R$ turned on, the flow proceeds from the step 5 to a step 7. The step 7 consists of the steps of the flow of program of FIG. 3 which is described in the foregoing. Referring again to FIG. 3, if the lens unit is found to be mounted on the camera body at the step 10, the flow proceeds to steps 11 and 12. At the steps 11 and 12, the exposure compensation value and the AE mode signal which have been stored at the steps 1 and 2 of FIG. 2 are read out (or reproduced) respectively. Step 13: The mode signal thus read out is checked. If the signal indicates the manual or shutter priority mode, the flow comes to the step 14 to read out the shutter time value stored at the step 3 of FIG. 2. If the signal read out is found at the step 15 to indicate the manual or aperture priority mode, the flow comes to the step 16. At the step 16, if the aperture value stored at the step 4 of FIG. 2 is found to be smaller than the maximum open F number value AVo, the flow comes to the step 17 to read out the value AVo as the setting value. Further, in this instance, the flow comes to the step 18 to flicker the display made at the display device DIS to give a warning.

If the maximum open F number value AVo is determined to be smaller than the stored aperture value, the flow comes to the step 19. At the step 19, a check is made to see if the stored aperture value is larger than the maximum stopped-down aperture value AVmax (minimum aperture value obtainable by stopping down the aperture). If so, the flow comes to the step 20 to read out the value AVmax as a setting value. The flow then comes to the step 21 to flicker the display elements DIS to give a warning. Meanwhile, if the value AVmax is found at the step 19 to be larger than the stored aperture value, the flow comes to the step 22 to read out the stored aperture.

Through the steps 13 to 22, the stored shutter time value is alone read out in the shutter priority mode. The stored aperture value is read out in the aperture priority mode if it is between the maximum open aperture value and the maximum stopped-down aperture value of the lens. If the stored aperture value represents an aperture larger than the maximum open aperture value, the maximum open aperture is read out. If the stored aperture value represents an aperture smaller than the maximum stopped-down aperture value, the stored aperture value is read out as the maximum stopped-down aperture value. Further, in the event of the manual mode, the shutter time value and the aperture value are read out in the same manner as described above.

With the aperture value reading controlled in the above stated manner, the embodiment is capable of adequately handling any lens even in cases where the lens is interchanged with another lens of different maximum and minimum aperture values after completion of the above-stated storing action.

Further, at the step 23, the lens position information which is stored at the step 5 of FIG. 2 is read out and supplied to the memory Ml of the lens unit LN. As a result, the lens is moved to the lens position corresponding to the information supplied.

After completion of the step 7 of FIG. 5 which is executed in the above-stated manner, the flow comes to the step 3 via the step 1'. In other words, the distance measuring action of the step 2 is omitted as the switch $SW_R$ is in an on-state and the lens is moved to the stored lens position supplied to the memory M1.

Figure 6A:
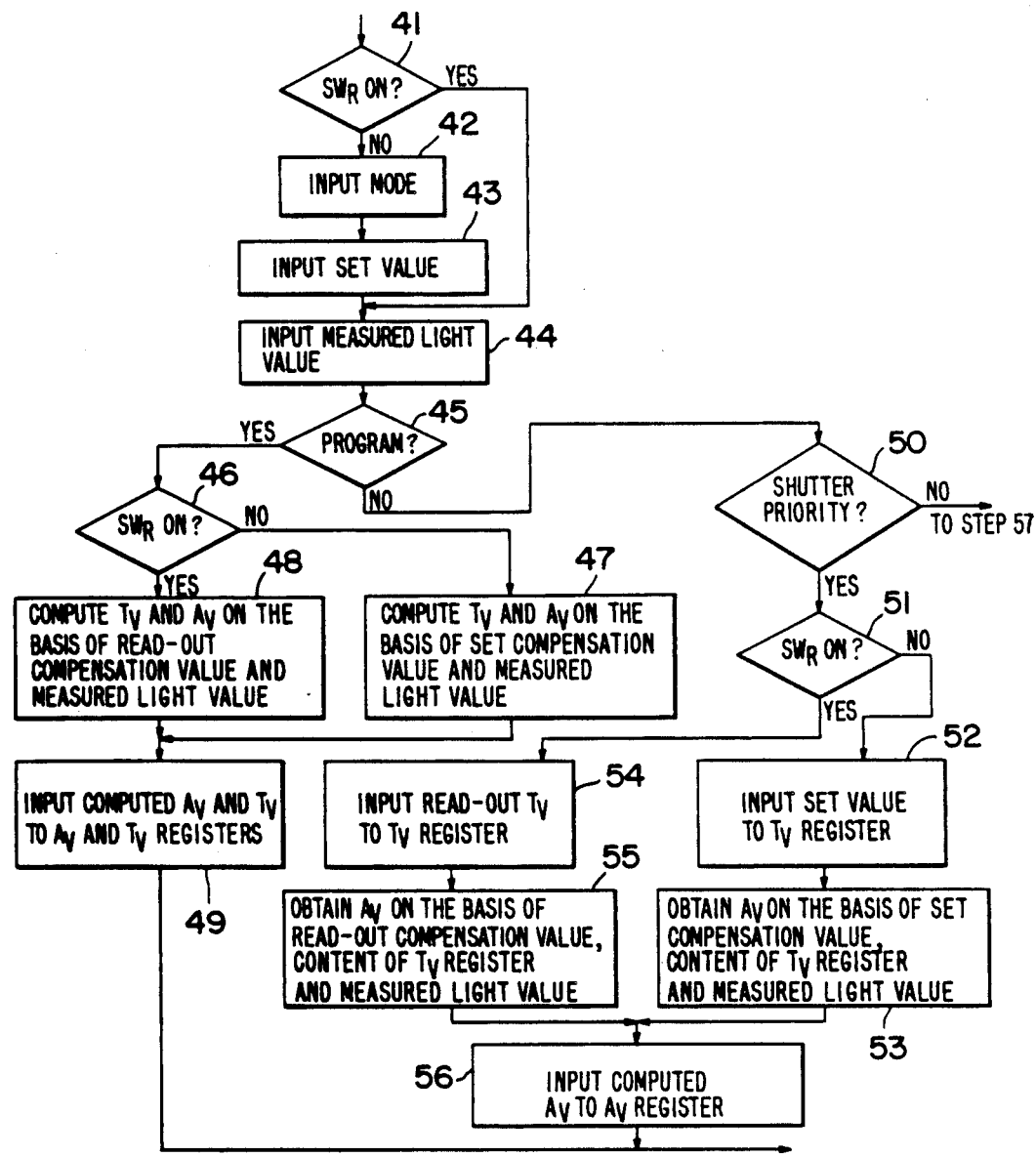
FIGS. 6(a) and 6(b) are flow charts showing the details of the step 3 of FIG. 3.
Figure 6B:
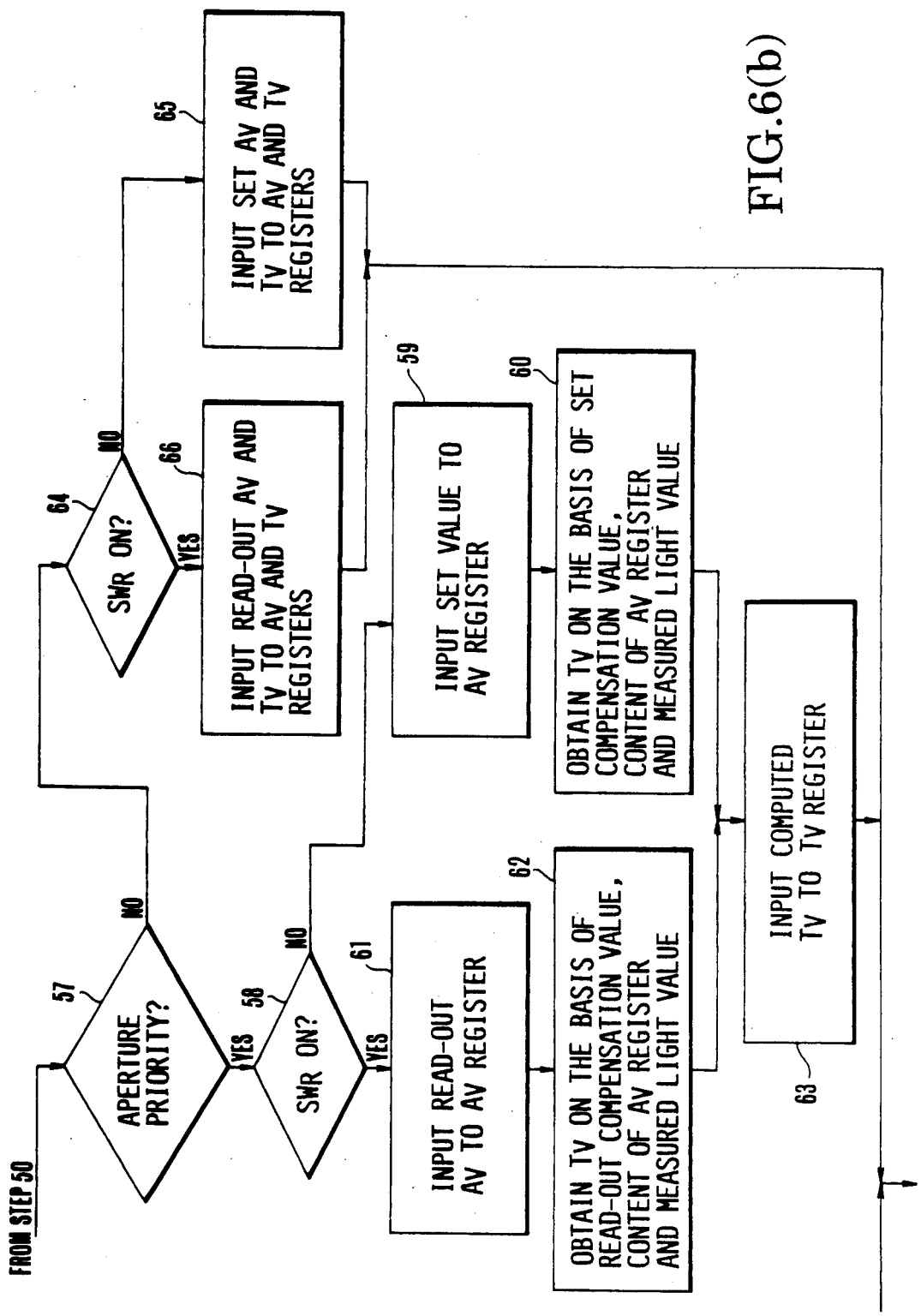

FIGS. 6(a) and 6(b) are flow charts showing the program of the exposure computing action of the step 3 of FIG. 5. In accordance with this program, if the switch $SW_R$ is found off at a step 41, the mode and the setting values set by the setting members MOD and COR are supplied at steps 42 and 43. At a step 44, the output of the light measuring circuit SPC is supplied. In the case of the program mode, a shutter time value and the aperture value are obtained on the basis of a compensation value and a measured light value set at steps 45, 46, 47 and 49. The values thus obtained are supplied, respectively, to TV and AV registers.

If the switch $SW_R$ is found to be in an on-state, the steps 42 and 43 are not executed and the measured light value is alone supplied at the step 44. Then, if the mode signal read out at the step 45 is found to be indicative of the program mode, steps 46, 48 and 49 are executed. Therefore, if the mode read out is the program mode, the shutter time and aperture values are obtained on the basis of the compensation value and the measured light value read out.

Further, if the selected mode or the mode read out is not the program mode, the program is executed as shown in steps from 50 through 66.

Therefore, at the step 3 of FIG. 5 after the reproducing action of the step 7 of FIG. 5, an exposure is computed on the basis of the set values stored.

Figure 7:
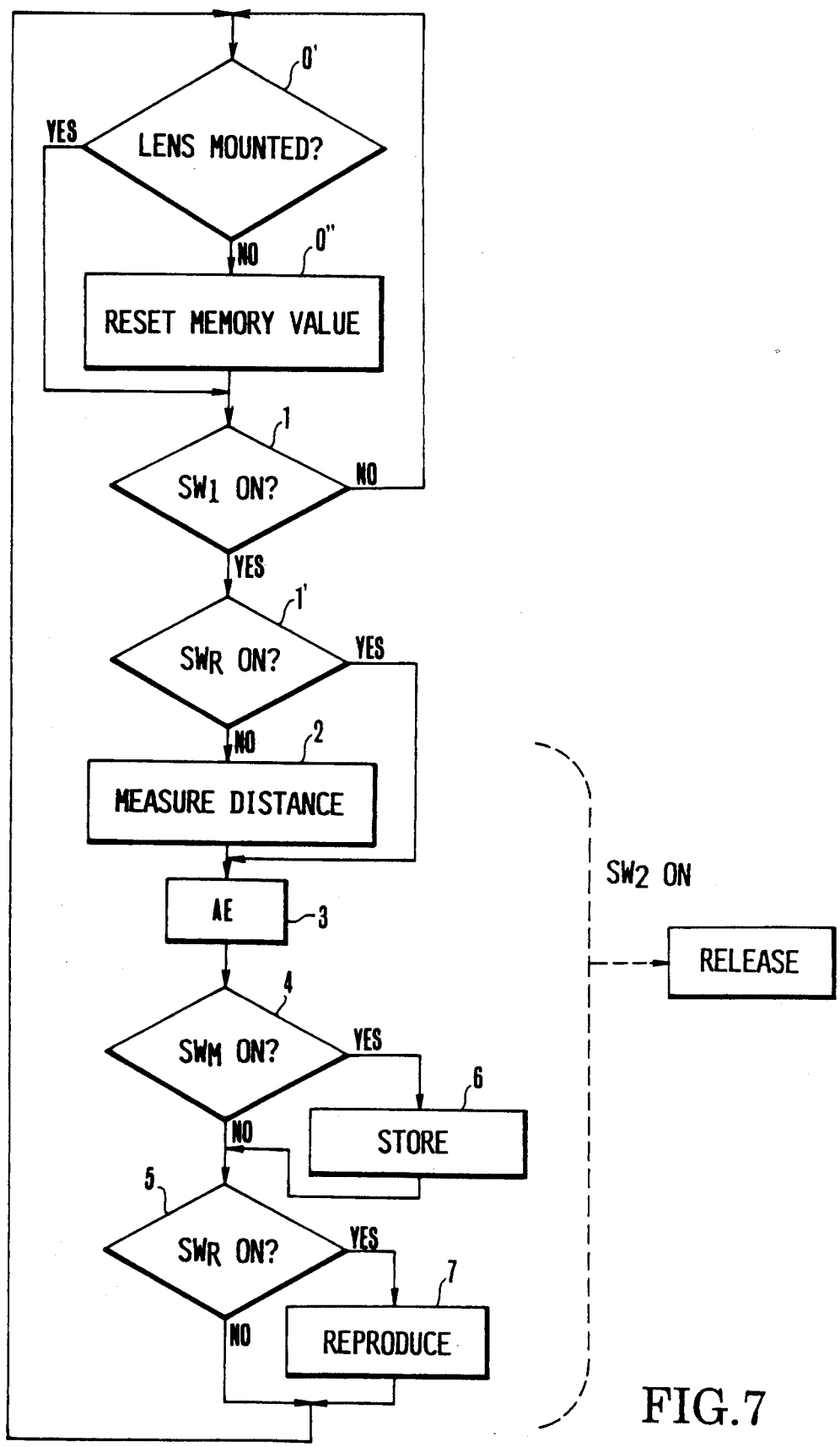
FIG. 7 is a main program flow chart showing the operation of another embodiment of the invention.

FIG. 7 is a flow chart showing the flow of a program of another embodiment of this invention. This flow is about the same as in the case of the flow of FIG. 5 described in the foregoing. The flow of FIG. 7 differs from that of FIG. 5 in the following manner: in this case, there are provided steps 0' and 0''. When the lens unit is dismounted, the flow comes to the step 0'' to reset the stored values stored at the step 6. Once the lens is dismounted, the values before that point of time are reset. This resetting arrangement effectively prevents occurrence of any problem that otherwise might arise when a different lens is mounted on the camera body after stored values are set.

What is claimed is:

1. A camera system comprising:
   (a) a focusing mechanism;
   (b) an exposure control circuit;
   (c) a storage circuit arranged to store focusing data relative to arbitrary focusing and exposure control data relative to exposure control; and
   (d) a reproducing circuit for driving said focusing mechanism on the basis of said focusing data stored in said storage circuit, said circuit arranged to shift a focusing state currently set by said focusing mechanism to a focusing state determined on the basis of said focusing data stored at said storage circuit and to cause said exposure control data stored at said storage circuit to be set at said exposure control circuit in place of the current exposure control data set at said exposure control circuit.

2. A camera system according to claim 1, wherein said exposure control data relative to exposure control is data for an exposure mode or data for a shutter time value or an aperture value.

3. A camera system according to claim 1, wherein said focusing mechanism is arranged to perform a focusing action under the control of an automatic focusing circuit and, when said reproducing circuit is operated, to have the focusing action controlled on the basis of said stored focusing data by the operation of said reproducing circuit independently of said automatic focusing circuit.

4. A camera system according to claim 1, further comprising a camera body; a lens unit which is mounted on said camera body in a manner interchangeable with other lens units; and a reset circuit which is arranged to cancel said stored data when said lens unit is dismounted from said camera body.

5. A camera system according to claim 1, further comprising a camera body; a lens unit which is mounted on said camera body in a manner interchangeable with other lens units; and an inhibiting circuit which is arranged to render said reproducing circuit inoperative when said lens unit is dismounted from said camera body.

6. A camera system comprising:
   (a) a photo-taking lens;
   (b) an automatic focusing circuit which includes a driving circuit for driving said photo-taking lens and is arranged to automatically focus said lens on an object to be photographed on the basis of automatic focusing data;
   (c) an exposure condition data setting circuit arranged to permit exposure condition data to be set by a manual operation;
   (d) an exposure control circuit arranged to perform exposure control on the basis of data set by said data setting circuit;
   (e) a storage circuit arranged to store focusing data relative to arbitrary focusing and also to store exposure condition data; and
   (f) a reproducing circuit arranged to transmit to said lens driving circuit said focusing data stored by said storage circuit in place of the automatic focusing data of said automatic focusing circuit, for driving said photo-taking lens on the basis of the stored focusing data, and to transmit to said exposure control circuit said exposure condition data stored by said storage circuit in place of said exposure condition data set by said exposure condition setting circuit.

7. A camera system according to claim 6, further comprising a first operation member, said first operation member being arranged to permit data which represents a currently focused state of said photo-taking lens and said data set by said setting circuit to be stored at said storage circuit by the operation of said member.

8. A camera system according to claim 7, wherein said exposure condition data is photographing mode data.

9. A camera system according to claim 7, wherein said exposure condition data represents either a shutter time value or an aperture value.

10. A camera system having a camera body and an interchangeable lens unit which is detachably mounted on said camera body, comprising:
    (a) a focusing mechanism for focusing;
    (b) a storage circuit arranged to store focusing data relative to arbitrary focusing;
    (c) a reproducing circuit arranged to shift a focusing state which is currently set by said focusing mechanism to a focusing state which is set on the basis of said focusing data stored by said storage circuit; and
    (d) a reset circuit arranged to cancel the data stored at said storage circuit when said lens unit is dismounted from or newly mounted on said camera body.

11. A camera system having a camera body and an interchangeable lens unit which is detachably mounted on said camera body, comprising:
    (a) a focusing mechanism for focusing;
    (b) a storage circuit arranged to store focusing data relative to arbitrary focusing;
    (c) a reproducing circuit arranged to shift a focusing state which is currently set by said focusing mechanism to a focusing state which is set on the basis of said focusing data stored by said storage circuit; and
    (d) an inhibiting circuit arranged to render one or both of said reproducing circuit and said storage circuit inoperative while said lens unit is in a state of being dismounted from said camera body.

12. A camera system having a camera body and an interchangeable lens unit which is detachably mounted on said camera body, comprising:
    (a) an automatic focusing circuit arranged to form automatic focusing data and to automatically focus a photo-taking lens on an object to be photographed by causing a lens to be driven by a lens driving circuit according to said automatic focusing data;
    (b) a storage circuit arranged to store data relative to arbitrary focusing;
    (c) a reproducing circuit arranged to cause said lens driving circuit to drive said lens on the basis of said data stored by the storage circuit instead of said automatic focusing data; and
    (d) a reset circuit arranged to cancel the data stored at said storage circuit when said lens unit is dismounted from or newly mounted on said camera body.

13. A camera system having a camera body and an interchangeable lens unit which is detachably mounted on said camera body, comprising:
  (a) an automatic focusing circuit arranged to form automatic focusing data and to automatically focus a photo-taking lens on an object to be photographed by causing a lens to be driven by a lens driving circuit according to said automatic focusing data;
  (b) a storage circuit arranged to store data relative to arbitrary focusing;
  (c) a reproducing circuit arranged to cause said lens driving circuit to drive said lens on the basis of said data stored by the storage circuit instead of said automatic focusing data; and
  (d) an inhibiting circuit arranged to render one or both of said reproducing circuit and said storage circuit inoperative while said lens unit is in a state of being dismounted from said camera body.

14. A camera system according to claim 10, further comprising a storage control circuit which is arranged to have data stored at said storage circuit by the operation of an operation member.

15. A camera system according to claim 11, further comprising a storage control circuit which is arranged to have data stored at said storage circuit by the operation of an operation member.

16. A camera system according to claim 13, further comprising a storage control circuit which is arranged to have data stored at said storage circuit by the operation of an operation member.

17. A camera system according to claim 11, wherein said reproducing circuit is arranged to operate in response to the operation of an operation member.

18. A camera system according to claim 13, wherein said reproducing circuit is arranged to operate in response to the operation of an operation member.

* * * * *

UNITED STATES PATENT AND TRADEMARK OFFICE
CERTIFICATE OF CORRECTION

PATENT NO. : 5,003,337

DATED : March 26, 1991

INVENTOR(S) : Kenichiro Amano

It is certified that error appears in the above-identified patent and that said Letters Patent is hereby corrected as shown below:

Title Page:
[30] At Foreign Application Priority Data:

"Apr. 10, 1988 [JP] Japan ... 63-250327" should read
--October 10, 1988 [JP] Japan ... 63-250327--.

[56] At U.S. Patent Documents:

"4,623,234 11/1086 Shimizu, et al. ..... 354/286"
should read --4,623,234 11/1986 Shimizu, et al.
... 354/286--.

COLUMN 1:

Line 49, "performed" should read --performed,--.

UNITED STATES PATENT AND TRADEMARK OFFICE
CERTIFICATE OF CORRECTION

PATENT NO. : 5,003,337

DATED : March 26, 1991

INVENTOR(S) : Kenichiro Amano

It is certified that error appears in the above-identified patent and that said Letters Patent is hereby corrected as shown below:

COLUMN 7:

Line 66, "display elements" should read --display element--.

Signed and Sealed this

Third Day of November, 1992

Attest:

DOUGLAS B. COMER

Attesting Officer

Acting Commissioner of Patents and Trademarks